Patented June 7, 1938

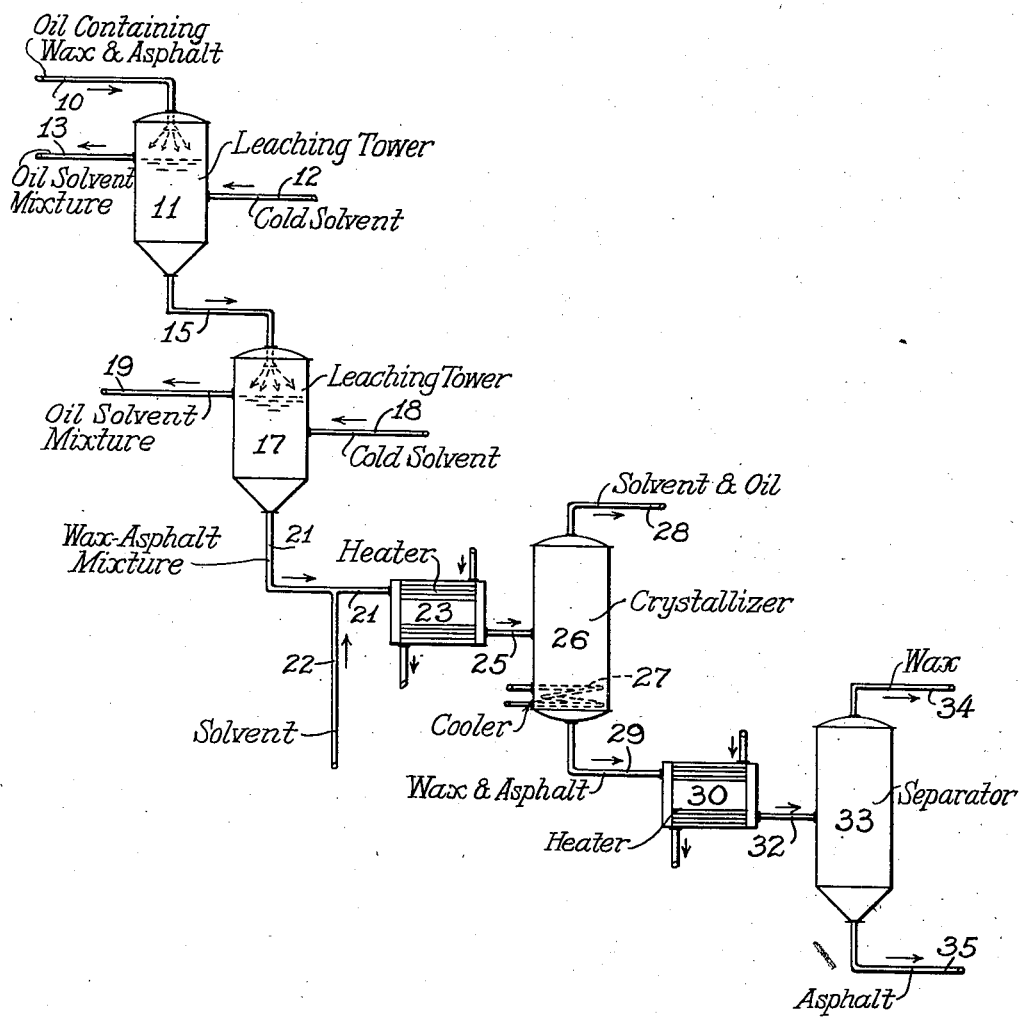

2,119,759

UNITED STATES PATENT OFFICE 2,119,759

SEPARATION OF WAX

Kenneth L. Wallin, San Pedro, Calif., assignor to Union Oil Company of California, Los Angeles, Calif., a corporation of California Application October 29, 1935, Serial No. 47,276

7 Claims. (Cl. 196—20)

This invention relates to a process for separation of wax from a mixture thereof with asphaltic and resinous materials. More specifically, it relates to a process for separating a mixture of wax and asphaltic and/or resinous materials from an oil containing same, and then separating and resolving the thus obtained mixture into separate fractions of wax and of asphaltic and/or resinous materials.

Asphalt may be separated from oil either by distillation or solvent extraction. By the ordinary distillation methods, the oil, being more volatile than the asphalt, is vaporized, and may then be condensed and recovered as a distillate, while the asphalt, which is substantially non-volatile at the temperatures required to vaporize the oil, remains in the still and is recovered as a residue. If wax is present in the oil being de-asphaltized, the wax is partially distilled overhead in the medium and heavy overhead distillate fractions. A complete separation of the remaining wax from the asphaltic residue cannot be obtained by any ordinary distillation means owing to the high boiling point of certain of the paraffin or wax members present. If a further separation of the wax from the overhead distillate is desired, this must be accomplished by processes such as cold settling, cold pressing or centrifuging which are well known to those skilled in the art.

In employing solvent extraction for the separation of oil and asphaltic materials, it is possible to use solvents in which the oil is relatively soluble but in which the asphaltic materials are relatively insoluble. Thus, when naphtha, gasoline or even the lighter hydrocarbons, such as liquid ethane, propane or butane, are employed as selective solvents to separate the asphaltic materials from the oil, the former being substantially insoluble in the foregoing solvents, are left as a residue while the oil is separated from this insoluble residue as a solution of oil in the solvent. The term "solvent extraction", as used hereinbelow, is intended to include the above type of asphalt precipitating solvents.

Where wax is present in the oil containing asphaltic materials, the wax may be separated along with the solvent and oil by maintaining the solvent at a temperature at which the wax is dissolved in the solvent together with the oil. The wax may then be removed from the asphalt-free solution by chilling the solution and then separating the precipitated wax by settling, filtering or centrifuging.

Another method consists in commingling the wax and asphalt containing oil with a solvent at such a temperature that only the oil is dissolved therein, the mixture of wax and asphalt being recovered as the undissolved precipitate. The further separation of the thus obtained mixture into the wax and asphalt components involves difficulties. Thus, an ordinary asphalt-wax mixture obtained as a precipitate from a solvent extraction of an oil containing wax and asphaltic materials may be heated to a temperature above the melting point of wax without any separation of an asphaltic phase.

One of the known methods of resolving asphalt-wax mixtures consists in commingling the asphalt-wax mixture at atmospheric or elevated temperatures with a light hydrocarbon solvent, such as liquefied propane. The solvent dissolves the wax from the asphalt, the wax being then recovered from the hydrocarbon solvent solution by distillation of the solvent or by refrigeration of the solution to precipitate the wax. However, in the operation of this process, some of the asphalt still remains dissolved in the solvent solution along with the wax, and comes out together with the wax upon distillation or refrigeration.

It is, therefore, an object of the present invention to provide a method which would obviate the above difficulties and which would resolve such asphalt-wax mixtures more easily and economically.

It has now been discovered that the relatively small amounts of oil still remaining in an asphalt-wax mixture obtained from a solvent extraction of an oil containing said substances, prevent an easy resolution of the mixture into its constituent fractions. It was further discovered that these relatively small amounts of oil act as a mutual solvent for both the wax and the asphaltic materials, thus maintaining them in the form of a homogeneous mixture above the melting point of the wax. It was still further discovered that the miscibility of the wax and of the asphalt materials decrease with a decrease in the amount of oil remaining in such asphalt-wax mixture. Thus, an asphalt-wax mixture as removed from a solvent extraction of an oil containing same may be heated above the melting point of the wax without any phase separation, while the same mixture, after a substantial de-oiling will deposit the asphaltic substances as a bottom layer when the mixture is heated to or somewhat above the melting point of the wax.

The term "asphalt-wax mixture", as used in the present specification and claims, includes mixtures of these substances as obtained from solvent extraction of an oil by filtration, centrifuging or ordinary precipitation. These mixtures may be in a liquid, semi-solid or solid state.

Therefore, broadly stated, the invention resides in a method for resolving an asphalt-wax mixture, as obtained from a solvent extraction of an oil containing same, or from any other similar source or operation, which comprises substantially de-oiling said mixture and subsequently raising the temperature of the thus de-oiled mixture to the melting point of the wax.

The invention further resides in a method for resolving an asphalt-wax mixture, as obtained from a solvent extraction or dewaxing of an oil containing same, which comprises commingling the asphalt-wax mixture with new quantities of a solvent under such condition that substantially all of the oil still remaining in said mixture is dissolved in said solvent, removing the oil-solvent mixture from the asphalt-wax mixture, and subsequently raising the temperature of the thus substantially de-oiled asphalt-wax mixture to or above the melting point of the wax, thus causing the asphalt to precipitate from the liquefied wax.

The above de-oiling step may be carried out by cold leaching of the asphalt-wax mixture or by dissolving the wax in a solvent followed by a recrystallization by refrigeration.

As an example of the realization of the process constituting the object of the present invention, a mixture of oil, asphalt and wax, having a gravity of 28.7° A. P. I. at 60° F. and a melting point of 115° F. was leached twice in propane at −40° F., the ratio of propane to mixture being each time 3 to 1. After filtration and the depropanizing of both the filtrate and the residual mixture, the filtrate, which constituted 40% of the original mixture treated, had a 21.0° A. P. I. gravity and a 0° F. pour point. The residual mass consisting of wax, asphalt and some oil still dissolved therein had a gravity of 34.3° A. P. I. at 60° F. and a melting point of 125° F. Although containing both asphalt and wax, it was impossible to separate them from each other, presumably due to the relatively high content of oil still present therein.

The wax-asphalt mixture, leached as described above, was then recrystallized from propane and filtered at 0° F. This operation was carried out three times at the end of which the washed wax-asphalt mixture constituted 48.6% by weight of the original substance treated, had a gravity of 39.0° A. P. I. at 60° F. and a melting point of 133° F. This wax-asphalt mixture had only 3.4% of oil still remaining therein as shown by an acetone-benzene method of testing. On heating the thus deoiled wax-asphalt mixture to a temperature at or above the melting point of the wax, substantially all of the asphalt in the mixture settled out of the molten wax, and it was found that the asphalt remained insoluble even when the temperature was raised up to 300° F.

It is to be noted that the wax-asphalt mixture, prior to the final deoiling by recrystallization from propane, still contained about 12% by weight of oil. Although applicant does not consider himself to be limited by any theory of the case, it is his opinion that the presence of this oil in the asphalt-wax mixture prevents the separation of the mixture into its component parts, and that the removal of the larger proportion of the oil still remaining in the leached wax permits the precipitation of the asphalt when the temperature of the final mixture is raised substantially to or above the melting point of the wax.

It is obvious that there is an optimum temperature for the separation of asphalt from the de-oiled wax, this optimum temperature depending on the character, viscosity, solvent power, etc. of the wax. This temperature, however, must be sufficient to reduce the viscosity of the wax to a point at which the asphalt may readily settle out. On the other hand it must be maintained sufficiently low to avoid dissolving of the more soluble portions of the asphalt in the thus liquefied wax.

The separation of the asphalt from the deoiled wax-asphalt mixture may be carried out by a simple sedimentation and decantation operation. However, filtration may be resorted to for the purpose of removing the asphalt from the melted wax. Obviously, the combination of the two methods is also applicable.

For a better understanding of the present invention reference is made to the accompanying drawing which discloses one form of a flow diagram which may be employed for the realization of the present invention. Referring to the drawing the oil containing wax and asphalt, is conveyed through line 10 into the first leaching tower 11 wherein it is leached, as for example, at a temperature of −40° F. with a cooled solvent such as propane introduced through line 12. The oil-solvent mixture is removed from said leaching tower through line 13 while the wax-asphalt mixture still containing oil is conveyed through line 15 to the second leaching tower 17.

Here again, this wax-asphalt mixture containing oil is leached with further quantities of cooled solvent being introduced into said tower 17 through line 18. The solvent with the oil dissolved therein is removed from said tower through line 19. The residual mass, consisting of wax-asphalt and some oil still dissolved therein is then removed from tower 17 through line 21 wherein it is commingled with optimum quantities of a solvent such as propane introduced through line 22. The mixture is then heated at 23 to a temperature at which the wax and asphalt become dissolved in the solvent, so that the mass conveyed then through line 25 into the crystallizer 26 is homogeneous. This crystallizer is cooled as by means of a cooler 27, the temperature being such as to cause recrystallization of the wax-asphalt mixture. The solvent and oil are removed from the crystallizer 26 through line 28 while the wax-asphalt mixture is withdrawn through line 29. The wax-asphalt mixture thus removed from the crystallizer 26 is then conveyed to a heater 30 in which the deoiled mixture is heated to a temperature at or above point of the wax, but below the melting point of the asphalt. This heated mixture is then conveyed through line 32 into separator 33 from which the molten wax is removed through line 34, while the solid asphalt particles precipitating to the bottom of separator 33 are withdrawn through line 35.

Although the invention has been described in connection with the separation into its constituent parts of an asphalt-wax mixture obtained from a solvent extraction or dewaxing of an oil containing these constituents, it is also possible to employ the same method to separate the asphalt or similar substances which have been added to an oil containing only wax. Thus, it is well known that asphaltic materials are used as dewaxing aids in the treatment of waxy oils with solvents. In such cases the asphaltic substances help to coagulate the particles of wax precipitated out of solution, thus aiding in the subsequent separation of the wax by any of the well-known processes. Obviously, the resultant precipitate, when removed from the filtrate, contains both the wax and the thus added asphaltic materials. This mixture can also be separated into its component parts by the above method of de-oiling and subsequent liquefaction of the wax.

The above disclosure particularly referred to the separation of wax from mixtures thereof with asphaltic substances. It is to be understood, however, that it is equally applicable to the removal of wax from mixtures containing resinous substances or resinous and asphaltic substances.

The present invention is not limited by any theory of operation, nor any details which have been given merely for purpose of illustration, but is limited only and by the following claims which cover the novelties inherent in the invention.

I claim:

1. In a process for resolving an asphalt-wax mixture obtained from an oil containing same and still containing residual oil dissolved in said mixture, the steps of removing substantially all of the residual oil from said asphalt-wax mixture, and raising the temperature of the thus de-oiled mixture to liquefy the wax thereby permitting the asphalt to precipitate therefrom.

2. In a process according to claim 1, wherein the de-oiled asphalt-wax mixture is heated to a temperature above the melting point of the wax but below the melting point of the asphalt, whereby the solid asphalt may precipitate from the thus liquefied wax.

3. A process for resolving an asphalt-wax mixture obtained from an oil containing same, said mixture still containing residual oil dissolved therein, which comprises treating said oil-containing asphalt-wax mixture with a solvent having preferential solubility for oil under conditions whereby substantially all of said residual oil is removed from said asphalt-wax mixture, separating the thus de-oiled asphalt-wax mixture from the solvent and the thus removed residual oil, heating the thus de-oiled asphalt-wax mixture to a temperature at which the wax is liquefied, but the asphalt remains in a solid state, and removing the solid asphalt from the thus liquefied wax.

4. A process for resolving an asphalt-wax mixture obtained from an oil containing same, said mixture still containing residual oil dissolved therein, which comprises treating said oil-containing asphalt-wax mixture with propane under conditions whereby substantially all of said residual oil is removed from said asphalt-wax mixture, separating the thus de-oiled asphalt-wax mixture from the propane and the thus removed residual oil, heating the thus de-oiled asphalt-wax mixture to a temperature at which the wax is liquefied, but the asphalt remains in a solid state, and removing the solid asphalt from the thus liquefied wax.

5. A process for resolving an asphalt, wax and oil mixture in which the oil content is approximately equal to the combined asphalt and wax content which comprises the steps of first removing substantially all of the oil contained in said mixture and subsequently raising the temperature of the thus de-oiled mixture to cause the asphalt to precipitate therefrom and separating the precipitated asphalt from the wax.

6. A process for resolving an asphalt, wax and oil mixture in which the oil content is approximately equal to the combined asphalt and wax content which comprises the steps of first removing oil from said mixture to produce an asphalt-wax mixture containing approximately 3.4% by weight of soil and subsequently raising the temperature of the thus de-oiled mixture to cause the asphalt to precipitate therefrom and removing the precipitated asphalt from the wax.

7. A process as in claim 5 in which the asphalt, wax and oil mixture is de-oiled by means of a solvent employed under conditions whereby substantially all of the oil contained in said mixture is dissolved in the solvent and the oil-solvent solution is removed from the asphalt-wax mixture.

KENNETH L. WALLIN.